Feb. 23, 1971    C. D. REID    3,565,565
APPARATUS FOR CLASSIFYING PATTERNS BY FREQUENCY
ANALYSIS OF DIFFRACTION IMAGES
Filed April 26, 1967    2 Sheets-Sheet 1

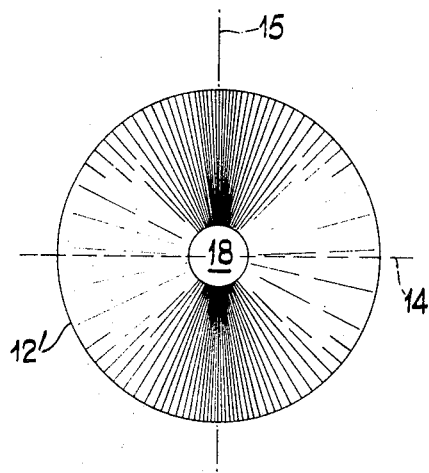
FIG.4a.
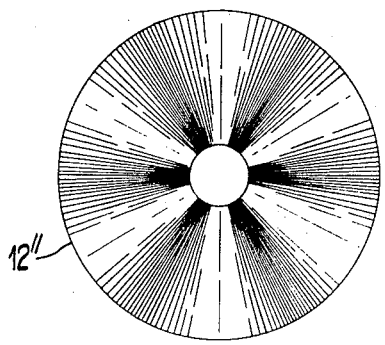
FIG.4b.
FIG.5
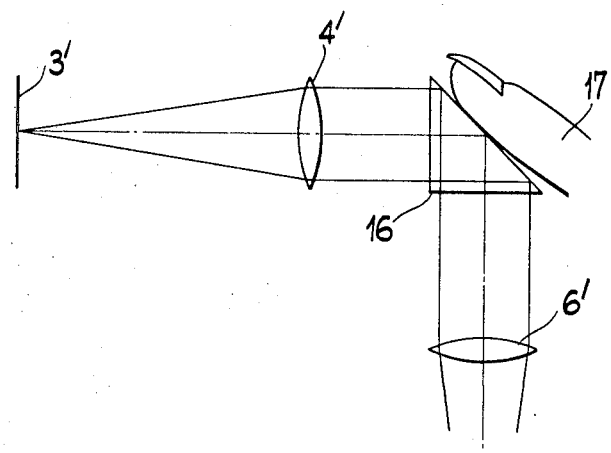

United States Patent Office 3,565,565
Patented Feb. 23, 1971

3,565,565
APPARATUS FOR CLASSIFYING PATTERNS BY FREQUENCY ANALYSIS OF DIFFRACTION IMAGES
Colin David Reid, Newbury, England, assignor to United Kingdom Atomic Energy Authority, London, England
Filed Apr. 26, 1967, Ser. No. 633,809
Claims priority, application Great Britain, Oct. 12, 1966, 45,704/66
Int. Cl. G06k 9/00
U.S. Cl. 356—71                                9 Claims

ABSTRACT OF THE DISCLOSURE

The apparatus uses a beam of collimated light e.g. from a laser, to produce a diffraction image of the pattern, e.g. a transparent fingerprint. This image is cyclicly scanned by a light filter, e.g. a disc having two co-linear radial slits, and the transmitted light converted to a cyclicly varying electrical signal. The signal is analysed for its content of a given fundamental frequency and several harmonics, in order to classify the pattern by its relative proportions of each frequency.

BACKGROUND OF THE INVENTION

This invention relates to apparatus for classifying patterns having well defined edges separating areas of different tones, particularly those in which lines of approximately constant width occur or in which a series of parallel forms or geometrical shapes can be observed, and has one application in classifying fingerprints.

SUMMARY OF THE INVENTION

According to the present invention apparatus for pattern classification comprises means for providing a beam of collimated light, means for locating the pattern relative to said beam to produce a diffraction image from the pattern, means for cyclicly scanning the diffraction image with a filter having at least one light-transmitting portion, means for converting the light transmitted from the image through said portion into a cyclicly varying electrical signal and means for determining the relative amplitudes of selected frequencies in said electrical signal.

The scanning may be circumferential or radial relative to the axis of the image. For circumferential scanning the filter may comprise at least one light-transmitting slit arranged radially relative to the axis of the diffraction image and rotatable relative to said image about said axis. Preferably two colinear radial slits are provided.

Alternatively the filter may be adapted to have uniform light transmission along any radius relative to the axis of the diffraction image but sinusoidally varying lght transmission around any circumference relative to said axis and to be rotatable about said axis relative to said image.

For radial scanning the filter may comprise an annular light-transmitting slit arranged concentrically with the image axis and whose diameter is controllable to scan the image in the radial direction. Alternatively the filter may comprise a plurality of annular light-transmitting slits of increasing but fixed diameter arranged concentrically with the image axis, and means for causing light from the image to be transmitted by each successive slit. Again, a fixed annular slit may be used and the effective magnification of the diffraction image varied cyclicly so that an annular part of the image is effectively swept over the slit.

DESCRIPTION OF THE DRAWINGS

To enable the nature of the present invention to be more readily understood, attention is directed, by way of example, to the accompanying drawings, wherein:
FIGS. 4(a) and 4(b) are plan views of alternative forms of scanning filter.
FIG. 5 is a schematic diagram of modified apparatus for obtaining a diffraction image of a fingerprint.

DESCRIPTION OF THE PREFERRED EMBODIMENT

Figure 1:
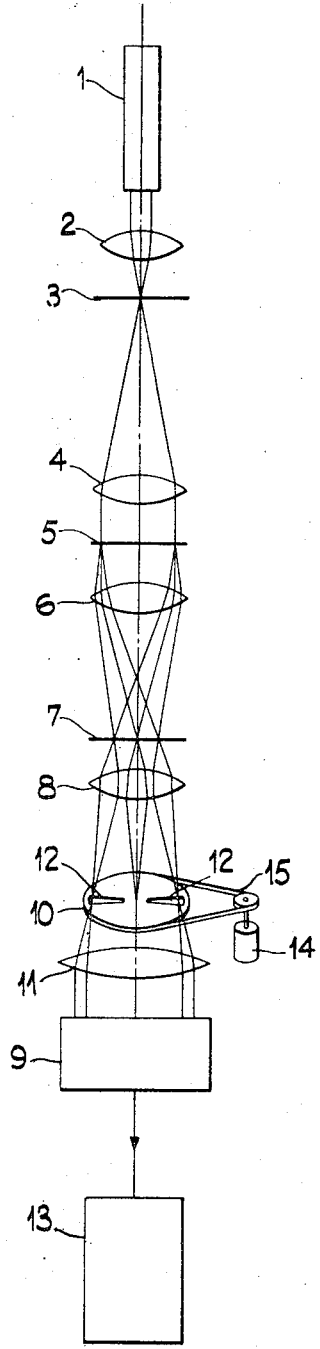
FIG. 1 is a semi-schematic diagram of apparatus embodying the present invention.

The apparatus shown in FIG. 1 comprises a helium-neon gas laser light-sources 1 whose ouput is focussed by a converging lens 2 on to a pinhole 3 to ensure complete coherence and apodisation (i.e. supprssion of high-order diffraction of the light. The use of a laser light source is not essential but is preferred as it gives more intense illumination. A laser providing a continuous (non-pulsed) output of 10 m.w. optical power at 6328 A. and a beam diameter of about ¼ inch is suitable. A collimating lens 4 renders the light parallel before passing through a transparency 5 of the pattern to be classified. The light leaving the transparency is refocussed by a lens 6 to produce an image 7 in the plane where an image of pinhole 3 would appear in the absence of transparency 5. With transparency 5 present, image 7 is a diffraction image also known as a Fourier transform) formed by the pattern. Lenses 4 and 6 are both first-quality telescope objectives, suitably having focal lengths of about 40 inches and spaced about 9 inches apart with the transparency spaced about half way between them. These spacings are not critical.

The size and distribution of the light patches in the diffraction image are dependent on the relative spacings and orientations of the edges within the pattern. The zero-order (central) image contains little more than information about the overall shape of the pattern and can be neglected without appreciable loss of information. The integrated intensity of light along any diameter of the image, excluding the zero-order light, is determined by the lengths of edge in the pattern at right angles to that diameter. The radial distribution of light along a diameter is determined by the relative arrangement and spacings of the edges transformed on that diameter.

Returning to FIG. 1, the image 7 is enlarged and projected by a lens 8 onto a photomultiplier detector 9 via a scanning disc 10 and a collecting lens 11. Suitably the lens 8 produces an image at disc 10 which is enlarged approximately ×12 relative to the image obtained at 7. The disc 10 is rotatable in a circumferential bearing (omitted for clarity) by means of a constant-speed electric motor 14 and belt drive 15. The photomultiplier 9 is provided with a red filter (not shown) to preferentially accept the laser light, and with a diffusing screen (not shown) to spread the transmitted light over the photomultiplier cathode surface and so reduce the effect of nonuniformities in the surface.

The above-described components are mounted on a conventional rigid optical bench, which is itself mounted on anti-vibration mountings.

Figure 2:
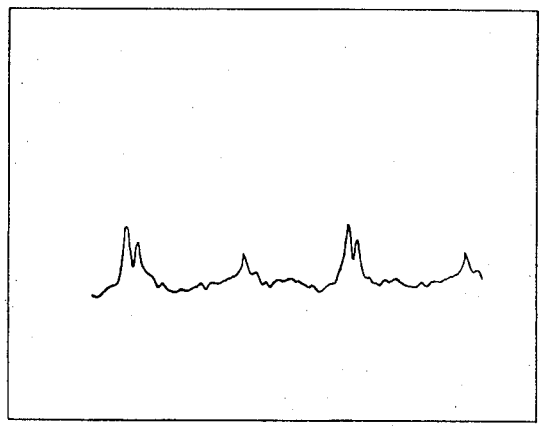
FIG. 2 shows the waveform of an electrical signal obtained by scanning a script letter C.
Figure 3:
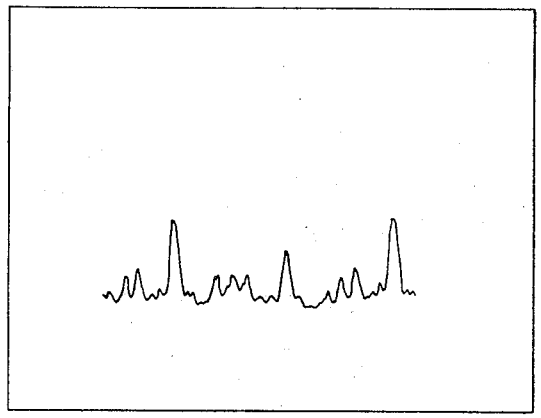
FIG. 3 shows the corresponding waveform obtained by scanning a finger print.

The scanning disc 10 is provided with two co-linear radial slits 12 and is rotated continuously about its axis to scan the diffraction image circumferentially. The output of the detector 9 varies according to the integrated light intensity in the direction of the slits, and is thus determined by the edges in the pattern at right angles to the slits. By varying the radial length of the slits, they can be arranged to scan that part of the image produced by features of a given size range within the pattern. Continuous rotation of the slits results in a repetitive output waveform from the detector which is determined fundamentally by the pattern direction characteristics. FIGS. 2 and 3 show the waveforms obtained by scanning the images of a script letter C and a fingerprint, respectively, with the form of slit shown in FIG. 1.

The use of two co-linear radial slits rather than one, as in FIG. 1, is not essential and is made possible by the 180° symmetry of the image; it enables the detector to receive twice as much light as if a single slit were used, thus improving the signal-to-noise ratio. The centre of the disc, being opaque, prevents transmission of light from the zero-order image.

Preferably the sides of the slits are radii of the disc as shown, rather than parallel-sided, so that the slit width diverges linearly towards tthe edge of the disc. Slits of this divergent shape make the derived frequency content substantially independent of the scale of magnification of the diffraction image. A suitable disc 10 has a radius of 1¾ inches, the opaque centre being ¼ inch in diameter and each slit 12 terminating ⅛ inch from the edge of the disc. The sides of the slits lie on radii of the disc and subtend an angle of 0.01 radians, i.e. at a radius of 1 inch, the slit is 0.010 inch wide.

The waveform or signal resulting from the scan of the diffraction image is subjected to frequency analysis.

The relative frequency content of the detector waveforms is characteristic of the pattern and can be used to provide a numerical classification code. The relative frequency content can be determined by feeding the waveform to a waveform analyser 13 which can take various known forms. Preferably a Fourier analysis is made, the fundamental frequency being twice the frequency of revolution of the disc 10. In one arrangement the analyser 13 comprises a plurality of filters tuned to pass the fundamental and the first several harmonics thereof. For example by using six such filters, the relative amplitude content of the fundamental and the first five harmonics can be determined. By determining these relative amplitudes to an accuracy of ±5%, each waveform can be classified by six decimal digits, allowing up to $10^6$ classes of fingerprint patterns to be established. Several fingerprint patterns may, of course, give the same frequency analysis and thus fall within the same class, depending on how fine a frequency analysis is undertaken. The use of more harmonics, e.g. ten, or a higher accuracy of estimation, gives correspondingly larger numbers of possible classes, and hence a correspondingly finer division of the patterns into classes.

A convenient rotation speed for disc 10 is 18 rev./sec., giving a fundamental frequency of 36 c./s. and harmonics at 72 c./s., 108 c./s. etc. up to 360 c./s. for the tenth harmonic.

Using separate filters centred on each of these ten frequencies, adequate discrimination, especially at the upper end of the spectrum, requires high Q circuits which are difficult to provide. It is therefore preferred to mix the signal from photomultiplier 9 with signals from ten fixed-frequency oscillators and to detect the difference signals. Each oscillator is set to a frequency only a few cycles different (e.g. 4 c./s.) from one of the corresponding frequencies whose amplitude is to be determined, and is highly stable. The difference signals are fed to low-pass filters having cut-offs just higher than 4 c./s. and the amplitudes of the outputs of these filters are proportional to the amplitudes of the corresponding frequency components.

Instead of rotating disc 12, the latter can be held stationary and the pattern 7 rotated.

FIG. 4 shows a form of scanning disc which gives the frequency content directly, without the need for subsequent analysis In FIG. 4(a) the light transmission of disc 12' varies sinusoidally around its circumference from a maximum on diameter 14 to a minimum on diameter 15. If such a disc, which can be produced by known photographic techniques, is rotated over the 180° symmetrical image, it can be shown that the photomultiplier output consists of an AC component having a frequency equal to that of the fundamental AC component of the waveforms (FIGS. 2 and 3) which would be obtained with the simple slits of FIG. 1, and an amplitude proportional to the amplitude of the latter waveform, plus a DC component corresponding to the other frequencies present in the latter waveform. Preferably the centre 18 of the disc is again made opaque to eliminate light from the zero-order image. The amplitudes of the harmonics are obtained by using further discs whose light transmission varies sinusoidally around the circumference through a correspondingly increased number of cycles. For example FIG. 4(b) shows a scanning disc for obtaining an AC component corresponding to the second harmonic. The fundamental frequency is again twice the frequency of revolution of the disc; for example if the discs are rotated at 18 rev./sec. the fundamental frequency is 36 c./s. and the harmonics are 72 c./s., 108 c./s. etc. By scanning the image successively with six such discs, AC outputs to give the aforementioned six decimal digits can be obtained. The form of disc shown in FIG. 6 also transmits more light than simple slits and thus improves the signal-to-noise ratio of the electrical signal.

In FIG. 5 the need to produce the transparency 5 of the fingerprint (FIG. 1) is eliminated by the substitution of a 45° right-angled prism 16 between lenses 4' and 6', which correspond in function to lenses 4 and 6 in FIG. 1. Normally the light from lens 4' would be totally internally reflected at the hypotenuse face of the prism and deflected through 90° to lens 6'. If a finger 17 is pressed against the hypotenuse face, the contact of the skin ridges on the glass destroys the total internal reflection at the areas of contact and light is only reflected from the spaces between the ridges and around the fingerprint. Thus a pattern of the fingerprint is provided at the prism from which a diffraction image is produced as in FIG. 1. Conveniently a 45°–90°–45° prism is used as shown, but other configurations comprising a surface at which total internal reflection takes place can be employed.

Instead of using radial slits (as in FIG. 1) or discs having radially uniform transmission (as in FIG. 4) to effect a circumferential scan, it is possible to scan the image radially with an annular slit which is concentric with the diffraction image, the diameter of the slit being varied to effect the scan. Another form of radial scan uses a scanning member having a plurality of such annular slits through which the light from corresponding annular areas of the image is successively allowed to pass to effect the scan. Yet another form of radial scanning is effected by using a fixed annular slit and cyclicly varying the effective magnification of the diffraction image. This can be done by a periodic axial movement of lens 8 (disc 10 being moved in synchronism to keep the diffraction image focussed in the plane of the disc). Alternatively it can be done by periodic axial movement of the transparency 5 in the divergent light beam preceding lens 4, or in the converging light beam following lens 6. In these ways an annular part of the image is effectively swept cyclicly over the fixed slit. The information content of the signals obtained with radial scanning is however less than that obtainable with circumferential scanning. A combination of circumferential and radial scanning can also be used.

The numerical codings obtained by frequency analysis of the signals are characteristic of the fingerprint or other pattern and can be compared by known data-processing techniques with the numerical codes corresponding to other fingerprints or patterns to assist in identification.

Although in the described embodiment the collimated light is coherent, and this is preferred, coherence is not essential to the present invention and suitable, though different, diffraction images can be produced using a collimated non-coherent light beam.

I claim:

1. Apparatus for pattern classification comprising means for providing a beam of collimated light, means for locating the pattern relative to said beam to produce a diffraction image from said pattern, a filter having at least one light-transmitting portion, means for causing relative rotary motion, about the axis of said image, between said filter and said diffraction image, means for converting the light transmitted from the image through said portion into a cyclicly varying electrical signal and means for determining the relative amplitudes in said electrical signal, of frequencies which are multiples of twice the frequency of rotation of said light-transmitting portion relative to said image.

2. Apparatus as claimed in claim 1 wherein said pattern is a transparency.

3. Apparatus as claimed in claim 1 wherein said filter comprises at least one light-transmitting slit arranged radially relative to the axis of the diffraction image and rotatable relative to said image about said axis.

4. Apparatus as claimed in claim 3 wherein said filter is a disc comprising two collinear radial slits and an opaque central portion.

5. Apparatus as claimed in claim 3 wherein the edges of said slit lie on radii of said disc to form a slit of divergent width.

6. Apparatus as claimed in claim 1 comprising a laser light source to produce said collimated light beam.

7. Apparatus as claimed in claim 1 comprising a prism having a surface at which total internal reflection takes place and located so that said coherent light beam is directed at said surface, whereby the diffraction image of a patterned object placed externally against said surface can be internally reflected from said surface for said cyclic scanning.

8. A method of classifying fingerprints comprising locating the fingerprint relative to a beam of collimated light to produce a diffraction image of said fingerprint, causing relative rotary motion, about the axis of said diffraction image, between said image and a filter having at least one light-transmitting portion, converting the light transmitted through said portion into a cyclicly varying electrical signal and determining the relative amplitudes in said electrical signal of frequencies which are multiples of twice the frequency of rotation of said light-transmitting portion relative to said image.

9. Apparatus for pattern classification comprising means for providing a beam of collimated light, means for locating the pattern relative to the beam to produce a diffraction image from said pattern, a filter having at least one light-transmitting portion, means for continuously moving said filter relative to said diffraction image to cause said light-transmitting portion to cyclicly scan said image, means for converting the light transmitted from the image through said portion into a cyclicly varying electrical signal and means for determining the relative amplitudes of selected frequencies in said electrical signal, said filter having uniform light transmission along any radius relative to the axis of the diffraction image but sinusoidally varying light transmission around any circumference relative to said axis.

References Cited

UNITED STATES PATENTS

| | | | |
|---|---|---|---|
| 3,200,701 | 8/1965 | White | 356—71 |
| 3,240,108 | 3/1966 | Lehan | 356—71 |
| 3,305,834 | 2/1967 | Cooper et al. | 356—71X |
| 3,383,767 | 5/1968 | Claassen et al. | 340—149A |
| 3,286,582 | 11/1966 | Mertz | 356—106 |
| 3,314,052 | 4/1967 | Lohman | 350—162 |

RONALD L. WIBERT, Primary Examiner

O. B. CHEW II, Assistant Examiner

U.S. Cl. X.R

250—219; 340—146.3